(12) United States Patent
Evans

(10) Patent No.: US 8,792,339 B2
(45) Date of Patent: Jul. 29, 2014

(54) METHOD AND SYSTEM FOR MOVING DISTINCTIVE TRAFFIC FLOWS TO A DIFFERENT PRIORITY SERVICE FLOW

(75) Inventor: David R Evans, Boulder, CO (US)

(73) Assignee: ARRIS Enterprises, Inc., Suwanee, GA (US)

( * ) Notice: Subject to any disclaimer, the term of this patent is extended or adjusted under 35 U.S.C. 154(b) by 337 days.

(21) Appl. No.: 12/189,626

(22) Filed: Aug. 11, 2008

(65) Prior Publication Data

US 2009/0040924 A1 Feb. 12, 2009

Related U.S. Application Data

(60) Provisional application No. 60/955,097, filed on Aug. 10, 2007.

(51) Int. Cl.
*H04L 1/00* (2006.01)
(52) U.S. Cl.
USPC .......................................................... 370/230
(58) Field of Classification Search
USPC ................. 370/229–235, 238, 395.2, 395.21, 370/395.43, 419, 420, 431, 468, 485, 480, 370/486, 408, 351, 352, 429, 203, 353, 458, 370/248
See application file for complete search history.

(56) References Cited

U.S. PATENT DOCUMENTS

| | | | | |
|---|---|---|---|---|
| 7,161,945 | B1 * | 1/2007 | Cummings | 370/401 |
| 7,551,643 | B2 * | 6/2009 | Yeo et al. | 370/469 |
| 7,571,251 | B2 * | 8/2009 | Bowman | 709/242 |
| 2002/0023174 | A1 * | 2/2002 | Garrett et al. | 709/245 |
| 2007/0109965 | A1 * | 5/2007 | Davis | 370/230.1 |
| 2008/0201785 | A1 * | 8/2008 | Overcash | 726/35 |
| 2009/0225677 | A1 * | 9/2009 | Williams | 370/253 |

OTHER PUBLICATIONS

Motorola "Next Generation CMTS Architecture", 2004.*

* cited by examiner

*Primary Examiner* — Yemane Mesfin
*Assistant Examiner* — Samina Choudhry
(74) *Attorney, Agent, or Firm* — Troy A. Van Aacken

(57) ABSTRACT

A cable modem termination system (CMTS) is adapted to move particular traffic flows to a different priority service flow. The CMTS includes detection logic, or is coupled to detection logic, to detect the presence of particular traffic, logic to establish a different priority service flow between a cable modem termination system and a cable modem, and flow control logic to direct a given packet on to the different priority service flow if the given packet contains information that matches one or more classifiers.

14 Claims, 2 Drawing Sheets

202 P2P SESSION?

204 SPECIAL SERVICE FLOW EXISTS ALREADY FOR CLIENT?

206 CMTS ESTABLISHES SPECIAL P2P FLOW

208 UPSTREAM FLOW?

210 CMTS PROVIDES CLASSIFIERS TO CM

212 INSTALL NEW CLASSIFIERS AT CMTS AND CM

METHOD AND SYSTEM FOR MOVING DISTINCTIVE TRAFFIC FLOWS TO A DIFFERENT PRIORITY SERVICE FLOW

PRIORITY CLAIM

This application claims priority under 35 USC 119 to U.S. provisional application No. 60/955,097 filed on Friday, Aug. 10, 2007.

BACKGROUND

One disadvantage of shared data networks is that certain types of applications may consume a disproportionate amount of bandwidth, switching, and other resources. Examples are peer-to-peer (P2P) applications, file-sharing programs and online interactive games. One approach to managing shared data networks hosting such applications is to limit or eliminate altogether the bandwidth provided for them, which of course may cause them not to function properly.

Such approaches have run into several obstacles, including consumer complaints and regulatory obstacles. Thus, an approach to their management is needed to deal with applications that consume disproportionate resources and which overcomes at least some of the limitations of priority approaches.

The following abbreviations may appear herein:
P2P—Peer to Peer
CMTS—Cable Modem Termination System
DOCSIS®—Data Over Cable Service Interface Specification
CM—Cable Modem
IP—Internet Protocol
TCP—Transmission Control Protocol
MSO—Multiple System Operator

BRIEF DESCRIPTION OF THE DRAWINGS

In the drawings, the same reference numbers and abbreviations identify elements or acts with the same or similar functionality for ease of understanding and convenience. In order to identify the discussion of any particular element or act, the most significant digit or digits in a reference number refer to the figure number in which that element is first introduced.

DETAILED DESCRIPTION

Figure 1:
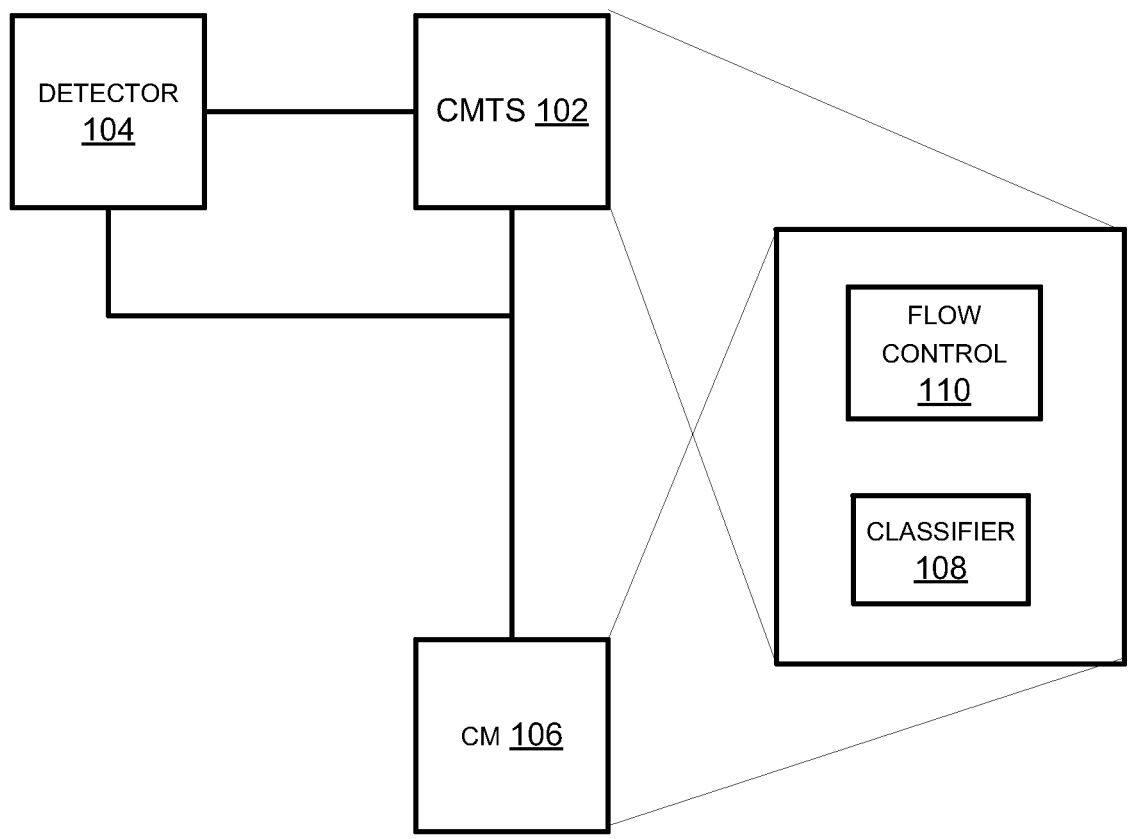
FIG. 1 is a block diagram of an embodiment of a system in accordance with the present invention.

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

In overview, a system is described for moving peer-to-peer traffic flows to a lower priority service flow. Those skilled in the art will readily appreciate that other embodiments could involve different types of traffic and/or use of a higher priority service flow. The system includes detection logic to detect the presence of peer-to-peer traffic, and logic to establish a low priority service flow between a cable modem termination system and a cable modem. The system also includes flow control logic to direct a given packet onto the low priority service flow if the given packet contains information that matches one or more classifiers.

The system may include logic to select one or more classifiers to be used for determining whether a packet from among a plurality of traffic packets is associated with a peer-to-peer traffic stream. The system may employ classification logic to compare each of the traffic packets from among the plurality of traffic packets with the one or more classifiers to determine if a match exists.

More generally, a method is described for assigning traffic having distinctive characteristics to a particular service flow. In response to detecting the presence of the distinctive characteristics, the particular service flow is established between a cable modem termination system and a cable modem. Packets of the traffic are directed onto the particular service flow if the packets match the distinctive characteristics. The particular service flow may be established by generating a dynamic service message for transmission to the cable modem and transmitting the dynamic service message to the cable modem.

FIG. 1 is a block diagram of an embodiment of a system in accordance with the present invention. A cable modem termination system (CMTS) 102 provides data exchange capabilities through a variety of customer premise devices. Examples of customer premise devices are set top boxes and personal computers. Customer premise devices comprise communication capabilities, such as a cable modem (CM) 106, for data exchange over a shared data network. Examples of shared data networks include cable television networks and the Internet, and combinations thereof. For purposes of this disclosure a preferred embodiment shall be discussed in reference to a cable television service provider network.

Numerous customer premise devices share the cable network. Therefore, the cable network is a shared resource which must be properly managed. Customers may undertake data exchange activities which consume disproportionate bandwidth resources of the cable network. Examples of such activities are peer-to-peer interactive gaming and file exchanges.

The CMTS 102 may employ logic to carry out detection of P2P or other applications which consume disproportionate resources. In some cases, a separate detection device 104 may be employed comprising such detection logic. When a disproportionate data flow application is detected, the CMTS 102 may employ classification logic 108 and flow control logic 110 to manage the data flow in a manner that reduces its impact on other applications of the shared data network. The CM 106 may also employ classification and flow control techniques in cooperation with the CMTS 102.

Exemplary techniques for detecting that a P2P session is occurring include:

a) Detecting the exchange by a customer premise device of large amounts of traffic simultaneously with multiple IP addresses. This method is adequate for several current P2P networks. Intelligent filters may be used to ensure that some other common protocols do not trigger the P2P detector.

b) Simultaneous heavy bidirectional traffic detection also works well, if traffic is not tagged as P2P until a substantial amount of traffic has flowed in both directions.

c) Detecting a connection of constant size used to download information from multiple hosts may also be an effective manner of detection. Most P2P applications download and upload files in fixed-size chunks; if this behavior is detected, then it is likely that P2P is being used.

There are other known methods of P2P detection that could be used, either alone or, more likely, in combination to flag P2P traffic. Detection can occur outside the CMTS 102, in which case the presence of a detected P2P stream is signaled to the CMTS 102 by another device 104; existing devices for this purpose detect and shape P2P traffic.

The "shaping" function as applied to P2P traffic may be implemented by the CMTS 102. However, when carried out by the CMTS 102, such 'shaping' may more aptly be referred to as dynamic priority control, which ensures that the P2P traffic does not affect the transmission of more important traffic. For example, if there is little other traffic, the P2P traffic may flow unimpeded, which does not happen with current systems.

In some implementations, signaling of the dynamic priority control may be facilitated by DOCSIS Dynamic Service Flow messaging. When P2P traffic is detected, an MSO may choose to move the identified P2P traffic to a dedicated DOCSIS Service Flow that carries traffic at a lower priority than other traffic flows. An MSO may choose to regulate upstream traffic only, downstream only, or traffic in both directions, causing upstream, downstream or traffic in both directions, respectively, to be carried on low- or lower-priority service flows.

The operator may choose Service Class Names that define the parameters of the low-priority P2P flow(s) or the MSO may signal the parameters explicitly at the time that the traffic is moved to the lower-priority flows(s). As an example, assume that an MSO has pre-defined two Service Class Names, "P2PUpstream" and "P2PDownstream," whose parameters define the level of DOCSIS service that the operator wishes to assign to flows carrying upstream and downstream P2P traffic respectively. In one embodiment, the P2PUpstream and P2PDownstream service classes are provisioned to run at a lower priority than default traffic and other levels of traffic, such as voice traffic. Other constraints may also be applied by the operator as part of the definition of the Service Class Name.

Figure 2:
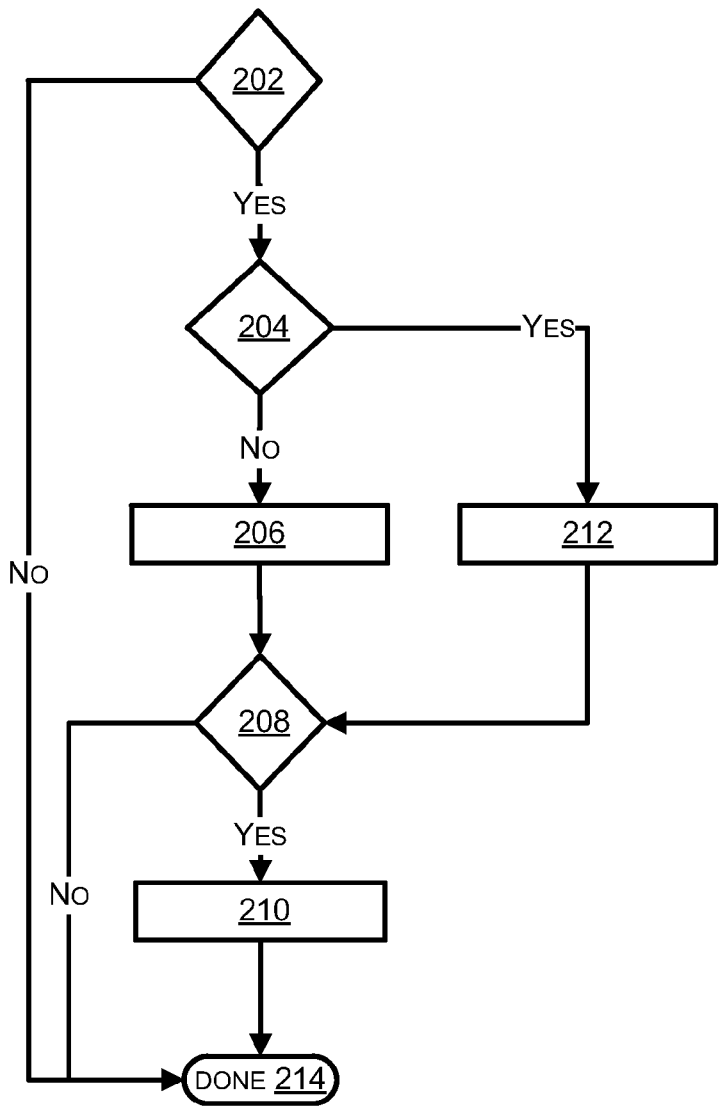
FIG. 2 is a flow chart diagram of an embodiment of a process in accordance with the present invention.

FIG. 2 is a flow chart of an embodiment of a process for managing P2P service flows. When the CMTS 102 has identified (either by application of an internal detection algorithm or by prompt messaging received from an external detecting device (104) that a P2P session is taking place at a customer premise device (act 202), it determines whether a special upstream and/or downstream P2P Dynamic Service Flow already exists for that client (204). If no such Flow exists, the CMTS establishes the flows(s) by exchanging DOCSIS Dynamic Service Add (DSA) Messages with the client (206). This process is detailed in the DOCSIS specifications versions 1.1 and higher and is known as "CMTS-Initiated Dynamic Service Addition." The DSA messages name the P2PUpstream and/or P2PDownstream Service Classes, so that the newly-created Dynamic Service Flow(s) have the pre-defined Quality of Service properties that have been set in advance by the operator.

If an upstream service flow is being created (208), the DSA includes one or more predetermined classifiers for the cable modem 106, or other client device, to use to identify a traffic stream as a P2P stream. Examples of classifiers include IP address and TCP port(s). The CM 106 compares the portion, or portions, of each packet designated for carrying information corresponding to the predetermined classifiers against the respective classifier/criteria, so that packets that match the classifier/criteria are directed to the upstream P2P Service Flow.

The classifiers 108 install into a memory under control of the CMTS 102 so that it can properly assign the downstream traffic packets to the P2PDownstream Service Flow to the customer device, and so that it can check that the CM 106 is correctly classifying packets on the P2PUPstream Service Flow. This is carried out by the flow control logic 110 by comparing relevant portions of the packets to the corresponding criteria. For example, if a packet has an IP destination address that is associated with a downstream P2P service to the cable modem 106, the packet is directed to be transmitted to the cable modem 106 over the P2P path established between the CMTS 102 and that particular CM 106.

If the service flow(s) already exist(s) to/from the customer device, the above acts (206) of creating and installing new Dynamic Service Flows(s)) are not performed. Instead, a DOCSIS Dynamic Service Change (DSC) exchange occurs to install an additional classifier(s) (act 212) (typically IP address and TCP Port(s)) at the CM 106 and at the CMTS 102 to identify a given P2P stream, so that packets that match the classifier will thenceforth be directed to the already-extant P2P service flow(s). The process concludes at 214.

In order not to consume CMTS resources unnecessarily, once a P2P service flow to/from a customer device has been detected as carrying no traffic for a predetermined configurable period of time, the CMTS 102 will exchange DOCSIS Dynamic Service Delete (DSD) messages with the CM 106 to delete the service flow(s), thus freeing the allocated resources.

Those having skill in the art will appreciate that there are various vehicles by which processes and/or systems described herein can be effected (e.g. hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g. as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal-bearing media used to actually carry out the distribution. Examples of a signal-bearing medium include, but are not limited to: recordable media such as floppy disks, hard disk drives, CD ROMs, digital tape, and computer memory; and transmission media such as digital and analog communication paths using TDM- or IP-based communication (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, logic having at least one discrete electrical circuit, logic having at least one integrated circuit, logic having at least one application specific integrated circuit, logic forming a general purpose computing device configured by a computer program (e.g., a general purpose computer configured by a computer program which at least partially carries out processes and/or devices described herein, or a microprocessor configured by a computer program which at least partially carries out processes and/or devices described herein), logic forming a memory device (e.g., forms of random access memory), and/or logic forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A method for moving peer-to-peer traffic flows to a lower priority service flow comprising:
    in response to detecting the presence of peer-to-peer traffic, if at least one upstream and downstream service flows that already exist for the peer-to-peer traffic is not a low priority service flow, establishing separate upstream and downstream service flows between a cable modem termination system and a cable modem; wherein establishing the service flows further comprises:
    establishing at least one of the service flows as a low priority service flow; directing a given packet onto the low priority service flow if the given packet contains information that matches one or more classifiers; wherein
    the classifiers are installed into a memory under control of a cable modem termination system, the cable modem termination system checking that the cable modem is correctly classifying packets on the upstream service flow; if a low-priority service flow between the cable modem termination system and the cable modem already exists, directing packets of the peer-to-peer traffic to the existing low-priority service flow;
    wherein directing packets of the peer-to-peer traffic to the existing low-priority service flow further comprises:
    employing a Data Over Cable Service Interface Specification (DOCSIS) Dynamic Service Change exchange to install additional classifiers at the cable modem or cable modem termination system to identify the peer-to-peer traffic, so that packets that match the classifiers are directed to the existing low-priority service flow; and in response to detecting the service flow as carrying no traffic for a predetermined period of time, the cable modem termination system exchange DOCSIS Dynamic Service Delete messages with the cable modem to delete the service flow.

2. The method for moving peer-to-peer traffic flows to a lower priority service flow of claim 1, wherein establishing a low priority service flow between a cable modem termination system and a cable modem further comprises: generating a dynamic service message for transmission to the cable modem and transmitting the dynamic service message to the cable modem.

3. The method for moving peer-to-peer traffic flows to a lower priority service flow of claim 1, wherein directing a given packet onto the low priority service flow if the given packet contains information that matches one or more classifiers further comprises: selecting one or more classifiers to be used for determining whether a packet from among a plurality of traffic packets is associated with a peer-to-peer traffic stream; and comparing each of the traffic packets from among the plurality of traffic packets with the one or more classifiers to determine if a match exists.

4. The method for moving peer-to-peer traffic flows to a lower priority service flow of claim 1, wherein establishing a low priority service flow between a cable modem termination system and a cable modem further comprises:

the cable modem termination system exchanging DOCSIS Dynamic Service Add (DSA) messages with the cable modem, the DSA messages naming upstream and-or downstream service classes, so that the newly-created low priority service flow has pre-defined quality of service properties that have been set in advance by a system operator.

5. A system for moving peer-to-peer traffic flows to a lower priority service flow comprising:

A non-transitory machine memory embodying logic, when executed by a processor, operable to perform operations comprising:

to detect the presence of peer-to-peer traffic; the machine memory embodying logic to establish, if at least one upstream and downstream service flows that already exist for the peer-to-peer traffic is not a low priority service flow, separate upstream and downstream service flows between a cable modem termination system and a cable modem; wherein establishing the service flows further comprises establishing at least one of the service flows as a low-priority service flow;

to direct a given packet onto the low priority service flow if the given packet contains information that matches one or more classifiers; the classifiers installed into the machine memory under control of the cable modem termination system, the cable modem termination system checking that the cable modem is correctly classifying packets on the upstream service flow;

to determine if a low-priority service flow between the cable modem termination system and the cable modem already exists, and if so, to direct packets of the peer-to-peer traffic to the existing low-priority service flow; and to employ a Data Over Cable Service Interface Specification (DOCSIS) Dynamic Service Change exchange to install additional classifiers at the cable modem and cable modem termination system to identify the peer-to-peer traffic, so that packets that match the classifiers are directed to the existing low-priority service flow; and in response to detecting the service flow as carrying no traffic for a predetermined period of time, the cable modem termination system exchange DOCSIS Dynamic Service Delete messages with the cable modem to delete the service flow.

6. The system of claim 5, further comprising: logic to generate a dynamic service message for transmission to the cable modem and to transmit the dynamic service message to the cable modem.

7. The system of claim 5, further comprising: logic to select one or more classifiers to be used for determining whether a packet from among a plurality of traffic packets is associated with a peer-to-peer traffic stream; and classification logic to compare each of the traffic packets from among the plurality of traffic packets with the one or more classifiers to determine if a match exists.

8. The system of claim 5, further comprising: logic to exchange DOCSIS Dynamic Service Add (DSA) messages with the cable modem, the DSA messages naming upstream or downstream service classes, so that the newly-created low-priority service flow has pre-defined quality of service properties that have been set in advance by a system operator.

9. A cable modem termination system (CMTS) adapted to move peer-to- peer traffic flows to a lower-priority service flow, the CMTS comprising:

A non-transitory machine memory embodying logic, when executed by a processor, operable to perform operations comprising:

to detect the presence of peer-to-peer traffic; the machine memory embodying logic to establish, if at least one upstream and downstream service flows that already exist for the peer-to-peer traffic is not a low priority service flow, separate upstream and downstream service flows between a cable modem termination system and a cable modem; wherein establishing the service flows further comprises establishing at least one of the service flows as a low-priority service flow;

to direct a given packet onto the low priority service flow if the given packet contains information that matches one or more classifiers; the classifiers installed into the machine memory under control of the cable modem termination system, the cable modem termination system checking that the cable modem is correctly classifying packets on the upstream service flow;

to determine if a low-priority service flow between the cable modem termination system and the cable modem already exists, and if so, to direct packets of the peer-to-peer traffic to the existing low-priority service flow; and to employ a Data Over Cable Service Interface Specification (DOCSIS) Dynamic Service Change exchange to install additional classifiers at the cable modem and cable modem termination system to identify the peer-to-peer traffic, so that packets that match the classifiers are directed to the existing low-priority service flow; and in response to detecting the service flow as carrying no traffic for a predetermined period of time, the cable modem termination system exchange DOCSIS Dynamic Service Delete messages with the cable modem to delete the service flow.

10. The CMTS of claim 9, further comprising:
logic to generate a dynamic service message for transmission to the cable modem and to transmit the dynamic service message to the cable modem.

11. The CMTS of claim 9, further comprising:
logic to select one or more classifiers to be used for determining whether a packet from among a plurality of traffic packets is associated with a peer-to-peer traffic stream; and classification logic to compare each of the traffic packets from among the plurality of traffic packets with the one or more classifiers to determine if a match exists.

12. The CMTS of claim 9, further comprising: logic to exchange DOCSIS Dynamic Service Add (DSA) messages with the cable modem, the DSA messages naming upstream and-or downstream service classes, so that the newly-created low priority service flow has pre-defined quality of service properties that have been set in advance by a system operator.

13. A method for assigning traffic having distinctive characteristics to a particular low-priority service flow, comprising:

in response to detecting the presence of the distinctive characteristics, and if at least one upstream and downstream service flows that already exist for the particular service flow is not a low priority service flow, establishing the particular service flow as one of a pair of separate upstream and downstream service flows between a cable modem termination system and a cable modem; wherein establishing the pair of separate service flows further comprises establishing at least one of the pair of separate service flows as a low priority service flow; and directing packets of the traffic onto the particular service flow if the packets match the distinctive characteristics; the distinctive characteristics represented as classifiers installed into a machine memory under control of the cable modem termination system, the cable modem termination system checking that the cable modem is correctly classifying packets on the upstream service flow;

determining if a low-priority service flow between the cable modem termination system and the cable modem already exists, and if so, to direct packets of the peer-to-peer traffic to the existing low-priority service flow, wherein directing packets of the peer-to-peer traffic to the existing low-priority service flow; and employing a Data Over Cable Service Interface Specification (DOCSIS) Dynamic Service Change exchange to install additional classifiers at the cable modem and cable modem termination system to identify the peer-to-peer traffic, so that packets that match the classifiers are directed to the existing low-priority service flow; and in response to detecting the service flow as carrying no traffic for a predetermined period of time, the cable modem termination system exchange DOCSIS Dynamic Service Delete messages with the cable modem to delete the service flow.

14. The method of claim 13, further comprising:

establishing the particular service flow by generating a dynamic service message for transmission to the cable modem and transmitting the dynamic service message to the cable modem.

\* \* \* \* \*